United States Patent
Gu et al.

(10) Patent No.: US 10,934,608 B2
(45) Date of Patent: Mar. 2, 2021

(54) NICKEL-CHROMIUM-IRON-BASED CASTING ALLOY

(71) Applicant: SAINT-GOBAIN SEVA, Chalons sur Saone (FR)

(72) Inventors: Yuefeng Gu, Tsukuba (JP); Jingbo Yan, Tsukuba (JP); Yaxin Xu, Tsukuba (JP); Fei Sun, Tsukuba (JP)

(73) Assignee: SAINT-GOBAIN SEVA, Chalons sur Saone (FR)

( * ) Notice: Subject to any disclaimer, the term of this patent is extended or adjusted under 35 U.S.C. 154(b) by 0 days.

(21) Appl. No.: 16/320,831

(22) PCT Filed: Jul. 26, 2017

(86) PCT No.: PCT/JP2017/027051
§ 371 (c)(1),
(2) Date: Jan. 25, 2019

(87) PCT Pub. No.: WO2018/021409
PCT Pub. Date: Feb. 1, 2018

(65) Prior Publication Data
US 2019/0153572 A1    May 23, 2019

(30) Foreign Application Priority Data
Jul. 27, 2016  (JP) .............................. JP2016-147806

(51) Int. Cl.
| C22C 30/00 | (2006.01) |
| C22F 1/10  | (2006.01) |
| C03B 37/04 | (2006.01) |
| C22C 19/05 | (2006.01) |

(52) U.S. Cl.
CPC ............ *C22C 30/00* (2013.01); *C03B 37/047* (2013.01); *C22C 19/053* (2013.01); *C22C 19/055* (2013.01); *C22C 19/056* (2013.01); *C22F 1/10* (2013.01)

(58) Field of Classification Search
CPC ..... C22C 19/056; C22C 19/055; C22C 30/00; C22C 19/053; C22F 1/10
See application file for complete search history.

(56) References Cited

U.S. PATENT DOCUMENTS

| 3,933,484 A | 1/1976 | Costin |
| 4,367,083 A | 1/1983 | Gaul |
| 4,662,920 A | 5/1987 | Coupland et al. |
| 4,877,435 A | 10/1989 | Haeberle, Jr. et al. |
| 6,266,979 B1 | 7/2001 | Johnson et al. |
| 2002/0073742 A1 | 6/2002 | Johnson et al. |
| 2005/0006802 A1 | 1/2005 | Spurlock |

FOREIGN PATENT DOCUMENTS

| JP | 59-6348 A | 1/1984 |
| JP | 59-28552 A | 2/1984 |
| JP | 8-290933 A | 11/1996 |

OTHER PUBLICATIONS

International Search Report as issued in International Patent Application No. PCT/JP2017/027051, dated Oct. 17, 2017.

*Primary Examiner* — Jessee R Roe
(74) *Attorney, Agent, or Firm* — Pillsbury Winthrop Shaw Pittman LLP

(57) ABSTRACT

A Ni—Cr—Fe-based casting alloy is provided for use in manufacturing a component for contacting molten glass, such as a centrifugal spinner for forming fibers of a molten glass by a rotary fiber forming process, for example. This Ni—Cr—Fe-based casting alloy is suitable for use in manufacturing a component for contacting molten glass, and contains, in terms of mass percent, 15-30% Cr, 15-30% Fe, 2.5-5.0% Co, 3.0-6.0% W, 0.0-2.0% Ti, 0.5-2.5% Nb, 0.5-2.0% Mo, and 0.5-1.2% C, the remainder including nickel and unavoidable impurities.

8 Claims, 1 Drawing Sheet

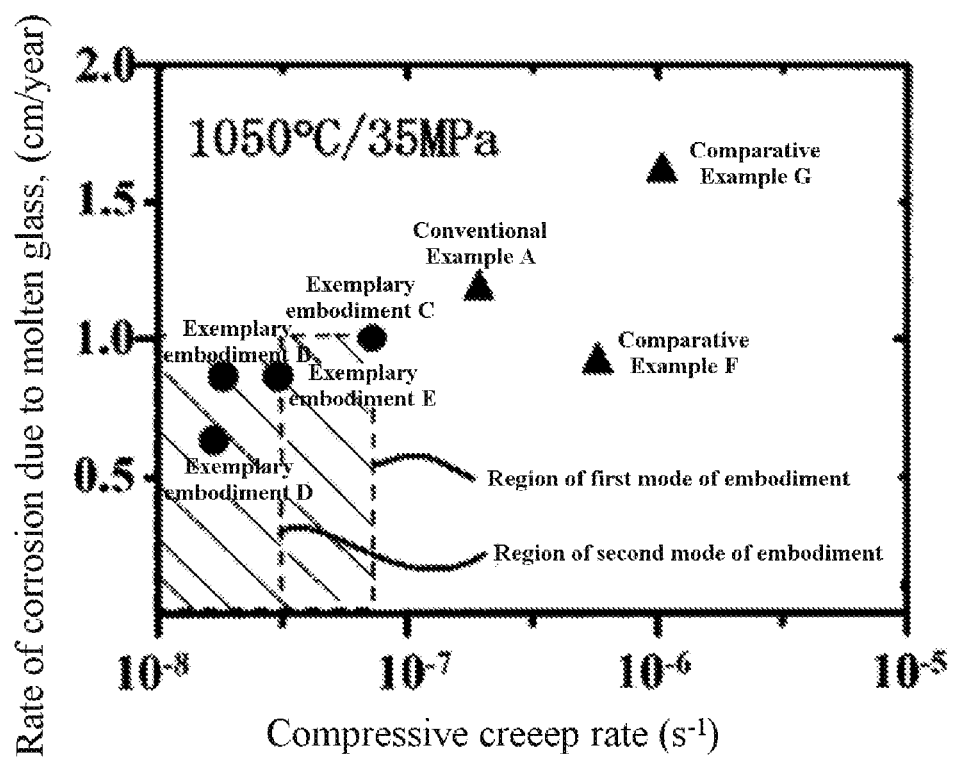

NICKEL-CHROMIUM-IRON-BASED CASTING ALLOY

CROSS-REFERENCE TO RELATED APPLICATIONS

This application is the U.S. National Stage of PCT/JP2017/027051, filed Jul. 26, 2017, which in turn claims priority to Japanese patent application number 2016-147806 filed Jul. 27, 2016. The content of these applications are incorporated herein by reference in their entireties.

TECHNICAL FIELD

The present invention relates to a Ni—Cr—Fe-based casting alloy having excellent mechanical strength and corrosion resistance in relation to molten glass. An alloy according to the present invention is especially suitable as a material for use in the production, preferably casting, of components which come into contact with a high-temperature liquid inorganic substance such as molten glass, for example, such as a centrifugal spinner for breaking down molten glass into fibers in a rotary fiberization process.

BACKGROUND ART

In the glass industry, glass fibers are produced by rotation of a spinner at a high temperature in a range of 1000-1200° C. The alloy in this case is therefore simultaneously subjected to high stress, high-temperature oxidation and corrosion attack. In order to ensure the quality of a glass product and to reduce costs, the spinner alloy must have excellent resistance to oxidation, glass corrosion and high-temperature creep while also having preferred characteristics such as low cost.

In order to satisfy the abovementioned characteristics at high temperatures, it is generally the case that cobalt (Co) and nickel (Ni) alloys, which are resistant to high temperatures, are typically used in the production of components which come into contact with molten glass, for example inside a centrifugal spinner for fiberizing molten glass in a rotary fiberization process. Such alloys are disclosed in Patent Documents 6 and 7, for example.

Meanwhile, a number of Co—Cr-based alloys and Ni—Cr-based alloys are disclosed in Patent Documents 1-5. Ni-based alloys are superior to Co-based alloys from an economic point of view because Ni is far less costly than Co. For example, according to current (July 2016) metals trading prices, 1 kg of Ni is comparable in price with 1 troy ounce (approximate 31 g) of Co.

However, these conventional Co-based alloys and Ni-based alloys contain large amounts of Ni, Co, W and other high-melting-point elements. This makes Co-based alloys and Ni-based alloys costly while it is also difficult to produce large components uniformly by casting.

An economical material which makes it possible to satisfy these requirements for use in the production of components which come into contact with molten glass therefore does not currently exist. Investigations of spinner materials which are currently available reveal the difficulty in achieving the necessary combination in terms of strength, oxidation resistance and corrosion resistance, as well as cost and producibility.

PRIOR ART DOCUMENTS

Patent Document

Patent Document 1: U.S. Pat. No. 3,933,484
Patent Document 2: U.S. Pat. No. 4,367,083
Patent Document 3: U.S. Pat. No. 4,662,920
Patent Document 4: U.S. Pat. No. 4,877,435
Patent Document 5: U.S. Pat. No. 6,266,979
Patent Document 6: U.S. Publ. Pat. No. 2002-73742
Patent Document 7: U.S. Publ. Pat. No. 2005-06802

SUMMARY OF THE INVENTION

Problem to be Solved by the Invention

The aim of the present invention lies in solving the abovementioned problem by providing a novel casting alloy which is useful for components such as a centrifugal spinner for fiberizing molten glass in a rotary fiberization process, for example. The casting alloy according to the present invention can be used for casting of components which come into contact with molten glass and simplifies production by virtue of having excellent corrosion resistance and durability in molten glass for a long period of time.

The present invention therefore provides a nickel-chromium-iron-based casting alloy having improved high-temperature mechanical strength and corrosion resistance in high-temperature molten glass.

Means for Solving the Problem

The inventors of the present invention found that an alloy demonstrates advantageous creep strength and corrosion resistance at high temperatures as a result of actively adding iron (Fe) in a range of 15-30 mass % to a Ni—Cr-based alloy for casting of a spinner material. The inventors furthermore found that it is very simple to produce a Ni—Cr-based alloy for casting with added Fe by appropriately controlling the composition of the main constituent elements such as Ni, Cr and Fe, for example.

It was furthermore found that in order to maintain the casting properties of a Ni—Cr-based alloy with added iron having high-temperature creep strength, it is necessary to add and combine other alloying elements such as Ti, Nb, W and a high content of C. The present invention was achieved on the basis of these findings and has the following features.

(1) A Ni—Cr—Fe-based casting alloy according to a first mode of the present invention is suitable for use in the production of components which come into contact with molten glass and is characterized in that it contains, in mass %: Cr: 15-30%, Fe: 15-30%, Co: 2.5-5.0%, W: 3.0-6.0%, Ti: 0.0-2.0%, Nb: 0.5-2.5%, Mo: 0.5-2.0%, and C: 0.5-1.2%, with the remainder comprising nickel and inevitable impurities.

(2) In the Ni—Cr—Fe-based casting alloy of (1) according to the present invention, the content of each compositional element may preferably be at least any one or more of the following: Cr: 24.5-28.5%, Fe: 15-25%, Co: 3.0-4.5%, W: 3.0-5.0%, Ti: 0.7-1.5%, Nb: 0.5-1.4%, Mo: 1.0-1.5%, and C: 0.7-1.0%.

(3) In the Ni—Cr—Fe-based casting alloy of (1) or (2) according to the present invention, preferably, the 0.2% compressive yield strength at 1000° C. may be 100 MPa or greater, the steady compressive creep rate at 1050° C. and 35 MPa may be approximately $7.5 \times 10^{-8}$ $s^{-1}$ or less, and the estimated corrosion rate in molten glass at 1050° C. may be approximately 10 mm/year or less.

(4) A Ni—Cr—Fe-based casting alloy according to a second mode of the present invention is suitable for use in the production of components which come into contact with molten glass and is characterized in that it contains, in mass %: Cr: 22-30%, Fe: 15-30%, Co: 2.5-4.5%, W: 4.0-6.0%, Ti:

0.0-2.0%, Nb: 0.5-1.4%, Mo: 0.5-2.0%, and C: 0.5-1.2%, with the remainder comprising nickel and inevitable impurities.

(5) In the Ni—Cr—Fe-based casting alloy of (4) according to the present invention, the content of each compositional element may preferably be at least any one or more of the following: Cr: 24.5-28.5%, Fe: 15-25%, Co: 3.0-4.0%, W: 4.0-5.0%, Ti: 0.7-1.5%, Mo: 1.0-1.5%, and C: 0.7-1.0%.

(6) In the Ni—Cr—Fe-based casting alloy of (4) or (5) according to the present invention, preferably, the 0.2% compressive yield strength at 1000° C. may be 100 MPa or greater, the steady compressive creep rate at 1050° C. and 35 MPa may be approximately $5.5 \times 10^{-8}$ $s^{-1}$ or less, and the estimated corrosion rate in molten glass at 1050° C. may be approximately 8.5 mm/year or less.

(7) A method for producing a casting employing a Ni—Cr—Fe-based casting alloy, for use as a spinner for fiberizing molten glass in a rotary fiberization process comprises the following steps:
(a) a step in which the Ni—Cr—Fe-based casting alloy of (1), (2), (4) or (5) above is provided;
(b) a step in which the alloy is melted and the alloy is allowed to harden in the air to ambient temperature to obtain an article in which hot casting defects are not present; and
(c) a step in which the article is heat treated at a temperature at least 20° C. below the melting start temperature of the alloy to obtain a final article.

(8) In the method for producing a casting employing a Ni—Cr—Fe-based casting alloy according to the present invention, the heat treatment step (c) preferably comprises: a step in which the article is heated for 2-4 hours at a temperature of between 1150° C. and 1250° C. which is at least 20° C. below the melting start temperature of the alloy; and a step in which the article is cooled to 550° C. or less at a rate of 65° C.-30° C. per minute, after which the article is cooled to ambient temperature in the air.

Advantage of the Invention

It has hitherto been considered that conventional alloys for a spinner for fiberizing molten glass in a rotary fiberization process exhibit the highest values in terms of high-temperature strength and corrosion resistance in molten glass among the Ni-based alloys and Co-based alloys produced by means of casting, and that such alloys will not be surpassed by other casting alloys. However, the present invention provides a Ni—Cr—Fe-based casting alloy which is superior to conventional alloys for a spinner in regard to high-temperature strength and corrosion resistance in molten glass.

BRIEF DESCRIPTION OF THE DRAWING

FIG. 1 is a graph showing the results of a compression test and a corrosion test at 1050° C. carried out using Ni—Cr—Fe-based alloys according to exemplary embodiments of the present invention, a conventional example, and comparative examples.

MODE OF EMBODIMENT OF THE INVENTION

The reasons for which the composition and content of a Ni—Cr—Fe-based casting alloy according to the present invention are limited as described above will be given below. It should be noted that in the following description, the percentages expressing content refer to mass %.

Iron (Fe): Fe improves the workability of the alloy and is also inexpensive, so the cost of the alloy is reduced by adding a large amount thereof. However, adding a large amount of Fe to a conventional Ni—Cr-based alloy is believed to be detrimental to the high-temperature strength and corrosion resistance. The Fe content is therefore preferably in a range of 15-30%, and it was found that if iron is added in an especially preferable range of between 15% and 25%, the workability of the alloy is improved without impairing the strength, oxidation resistance or corrosion resistance thereof. It was found by checking a plurality of alloys that when iron is added, there is a slight increase in mass in a 500 hour test of oxidation resistance.

Niobium (Nb): Niobium is an element which makes a large contribution to improving strength. In order to achieve this effect, the Nb content is preferably 0.5% or greater. When there is 2.5% or greater of Nb, macro-segregation occurs during melting and detrimental phase-geometry close-packing (TCP) phases such as delta phase and Laves phase are apparent in the alloy. The Nb content is therefore preferably 0.5-2.5%, and especially preferably 0.5-1.4%.

Titanium (Ti): Ti contributes to strengthening the grain boundary. In order to achieve this effect, the Ti content is preferably 0.5% or greater. However, when Ti is included in excess of 2.0%, there is a marked reduction in hot-workability and weldability of the alloy. The Ti content is therefore preferably 0.0-2.0%, and especially preferably 0.7-1.5%.

Carbon (C): C binds Nb, W and Ti for forming MC carbide. The MC carbide suppresses movement of the grain boundary by means of a pinning effect. However, if an excessive amount of C is added, the MC carbide is coarsely formed and consumes large amounts of the reinforcing elements, namely Nb, W and Ti, so the mechanical properties deteriorate. The C content is therefore preferably 0.5-1.2%, and especially preferably in a range of 0.7-1.0%.

Cobalt (Co): Co is an element for reducing stacking fault energy, and it adjusts the carbide distribution and refines the crystal grain size of an Fe—Cr-based heat resistant alloy. However, adding a large amount of Co to a Ni—Cr—Fe-based alloy tends to make a high proportion of Fe, Mo and W bind, forming a TCP phase. The Co content is therefore preferably 2.5-5.0%, and especially preferably in a range of 3.0-4.5%. Furthermore, the Co content is preferably 2.5-4.5%, and especially preferably in a range of 3.0-4.0%, in order to advantageously maintain high-temperature creep characteristics and resistance to corrosion by molten glass.

Molybdenum (Mo) and tungsten (W): Mo and W are added in order to improve the strength of the alloy at high temperatures by means of solid solution strengthening in the parent phase. In order to achieve the effect thereof, the lower limit value of the content of these elements is preferably 0.5% for Mo and 3.0% for W. If these elements are included in an excessive amount, a TCP phase forms in the alloy, so the upper limit value of the content of these elements is preferably 2.0% for Mo and 6.0% for W. In this regard, the Mo content is preferably 0.5-2.0%, and especially preferably in a range of 1.0-1.5%. Furthermore, the W content is preferably 3.0-6.0%, and especially preferably in a range of 3.0-5.0%. Furthermore, the W content is preferably 4.0-6.0%, and especially preferably in a range of 4.0-5.0% in order to advantageously maintain high-temperature creep characteristics and resistance to corrosion by molten glass.

Chromium (Cr): Cr is an element which is effective for improving oxidation resistance and corrosion resistance. Furthermore, Cr contributes to improving hot-workability of the alloy defined in the present invention. In order to achieve these effects, Cr should be contained in an amount of 15% or greater. However, if Cr is included in an excessive amount, a detrimental TCP phase is formed. The Cr content is therefore preferably in a range of 15-30%, and especially preferably in a range of 24.5% to 28.5%. Furthermore, the Cr content is preferably in a range of 22% to 30%, and more preferably in a range of 24.5% to 28.5% in order to advantageously maintain high-temperature creep characteristics and resistance to corrosion by molten glass. The oxidation resistance of an alloy having a high added content of chromium is at virtually the same level as that of an alloy to which iron is added (15% to 25% iron) or to which iron is not added.

Exemplary embodiments for realizing the present invention will be given below in order to describe the invention in further detail. The present invention is not, of course, limited by the following exemplary embodiments.

Alloys A-G having the compositions shown in the following table 1 were produced by means of melting and casting. Among these alloys, the alloy A is a conventional example, the alloys B-E are exemplary embodiments included in the first mode of the present invention, and the alloys F and G are comparative examples having element contents beyond the scope defined in the present invention.

TABLE 1

| Alloy | Cr | Co | W | Ti | Nb | Mo | C | Fe | Ni |
|---|---|---|---|---|---|---|---|---|---|
| A | 28 | 3.0 | 7.4 | — | — | — | 0.7 | 6 | Bal. |
| B | 25 | 3.0 | 5.0 | — | 1.3 | 1.5 | 0.7 | 16 | Bal. |
| C | 20 | 4.5 | 3.5 | 0.5 | 1.5 | 1.3 | 0.9 | 23 | Bal. |
| D | 28 | 3.5 | 4.5 | 0.8 | 1.0 | 1.0 | 1.0 | 25 | Bal. |
| E | 25 | 4.0 | 5.0 | 1.3 | 0.5 | 1.5 | 0.9 | 25 | Bal. |
| F | 25 | 3.0 | 5.0 | 1.7 | 0.2 | 0.5 | 0.7 | 10 | Bal. |
| G | 28 | 3.0 | 7.4 | 2.5 | 3.0 | 3.0 | 0.7 | 35 | Bal. |

The alloys B-E according to the present invention, the commercially available alloy A, and the alloys F and G outside the scope of the present invention were subjected to a compression test, and the results thereof were compared. The results are shown in table 2. As shown in table 2, the 0.2% compressive yield strength at 1000° C. and the creep resistance value (compressive creep rate) at 1050° C./35 MPa of the alloys B-E according to the present invention were superior to those of the alloy A according to the conventional example and the alloys F and G according to the comparative examples.

TABLE 2

| Alloy | 0.2% Compressive yield strength (1000° C., 35 MPa) | Compressive creep rate (1050° C./ 35 MPa, s$^{-1}$) | Rate of corrosion due to molten glass (1050° C., mm/year) |
|---|---|---|---|
| A | 90 | 2.53 × 10$^{-7}$ | 12 |
| B | 136 | 2.53 × 10$^{-8}$ | 8 |
| C | 128 | 7.33 × 10$^{-8}$ | 10 |
| D | 135 | 2.19 × 10$^{-8}$ | 6 |
| E | 123 | 5.07 × 10$^{-8}$ | 8 |
| F | 85 | 6.82 × 10$^{-7}$ | 9 |
| G | 76 | 1.07 × 10$^{-6}$ | 16 |

The alloys were furthermore tested by means of static immersion in molten glass for 100 hours at 1050° C. in order to evaluate corrosion resistance. Table 2 shows the corrosion rate calculated by means of the average corrosion depth. The alloys B-E according to the present invention were slightly superior to the alloy A according to the conventional example and the alloys F and G according to the comparative examples. It should be noted that the rate of corrosion caused by molten glass is shown as the amount of corrosion per year, and an estimated value is shown based on an experimental value. The rate of corrosion due to molten glass was obtained by calculating the amount of corrosion per year using the experimental value of 100 hours.

FIG. 1 is a graph showing the results of the compression test and the corrosion test at 1050° C. carried out using the Ni—Cr—Fe-based alloys according to the exemplary embodiments of the present invention, the conventional example, and the comparative examples.

As shown in table 2 and FIG. 1, the Ni—Cr—Fe-based casting alloys according to the first mode of the present invention had a 0.2% compressive yield strength at 1000° C. of 100 MPa or greater, a steady compressive creep rate at 1050° C. and 35 MPa of approximately $7.5 \times 10^{-8}$ s$^{-1}$ or less, and an estimated corrosion rate in molten glass at 1050° C. of approximately 10 mm/year or less.

At the same time, Ni—Cr—Fe-based casting alloys according to the second mode of the present invention employed the alloys B, D and E having the compositions shown in table 1 as exemplary embodiments, but had a compositional range that did not include the alloy C. The second mode of the present invention showed even better high-temperature strength, creep resistance and corrosion resistance in molten glass than the first mode of the present invention. That is to say, as shown in table 2 and FIG. 1, the Ni—Cr—Fe-based casting alloys according to the second mode of the present invention had a 0.2% compressive yield strength at 1000° C. of 100 MPa or greater, a steady compressive creep rate at 1050° C. and 35 MPa of approximately $5.5 \times 10^{-8}$ s$^{-1}$ or less, and an estimated corrosion rate in molten glass at 1050° C. of approximately 8.5 mm/year or less.

Moreover, the Ni—Cr—Fe-based casting alloys according to the present invention were clearly comparable with or superior to the alloy of the conventional example and the alloys of the comparative examples outside the scope of the present invention in terms of high-temperature strength, creep resistance and corrosion resistance in molten glass (FIG. 1).

INDUSTRIAL APPLICABILITY

The present invention provides a novel Ni—Cr—Fe-based casting alloy for components which come into contact with molten glass. Examples of such components which come into contact with molten glass include centrifugal spinners for fiberizing molten glass in a rotary fiberization process. However, the Ni—Cr—Fe-based casting alloy according to the present invention is not limited to this, and it may be used in applications for producing, preferably casting, components for fiberizing high-temperature liquefied inorganic substances similar to molten glass, for example, liquefied inorganic substances such as silicon or quartz.

The invention claimed is:

1. A Ni—Cr—Fe-based casting alloy suitable for use in a production of components which come into contact with molten glass, the Ni—Cr—Fe-based casting alloy consisting of, in mass %:
   Cr: 15-30%,
   Fe: 15-30%,
   Co: 2.5-5.0%,
   W: 3.0-6.0%,
   Ti: 0.0-2.0%, Nb: 0.5-2.5%,
Mo: 0.5-2.0%, and
C: 0.5-1.2%,
with the remainder consisting of nickel and inevitable impurities.

2. The Ni—Cr—Fe-based casting alloy as claimed in claim 1, wherein the content of each compositional element is at least any one or more of the following:
Cr: 24.5-28.5%,
Fe: 15-25%,
Co: 3.0-4.5%,
W: 3.0-5.0%,
Ti: 0.7-1.5%,
Nb: 0.5-1.4%,
Mo: 1.0-1.5%, and
C: 0.7-1.0%.

3. The Ni—Cr—Fe-based casting alloy as claimed in claim 1, wherein the 0.2% compressive yield strength at 1000° C. is 100 MPa or greater,
the steady compressive creep rate at 1050° C. and 35 MPa is approximately $7.5 \times 10^{-8}$ s$^{-1}$ or less, and
the estimated corrosion rate in molten glass at 1050° C. is approximately 10 mm/year or less.

4. A Ni—Cr—Fe-based casting alloy suitable for use in the production of components which come into contact with molten glass, the Ni—Cr—Fe-based casting alloy consisting of, in mass %:
Cr: 22-30%,
Fe: 15-30%,
Co: 2.5-4.5%,
W: 4.0-6.0%,
Ti: 0.0-2.0%,
Nb: 0.5-1.4%,
Mo: 0.5-2.0%, and
C: 0.5-1.2%,
with the remainder consisting of nickel and inevitable impurities.

5. The Ni—Cr—Fe-based casting alloy as claimed in claim 4, wherein the content of each compositional element is at least any one or more of the following:
Cr: 24.5-28.5%,
Fe: 15-25%,
Co: 3.0-4.0%,
W: 4.0-5.0%,
Ti: 0.7-1.5%,
Mo: 1.0-1.5%, and
C: 0.7-1.0%.

6. The Ni—Cr—Fe-based casting alloy as claimed in claim 4, wherein the 0.2% compressive yield strength at 1000° C. is 100 MPa or greater,
the steady compressive creep rate at 1050° C. and 35 MPa is approximately $5.5 \times 10^{-8}$ s$^{-1}$ or less, and
the estimated corrosion rate in molten glass at 1050° C. is approximately 8.5 mm/year or less.

7. A method for producing a casting employing a Ni—Cr—Fe-based casting alloy, for use as a spinner for fiberizing molten glass in a rotary fiberization process comprising:
(a) a step in which the Ni—Cr—Fe-based casting alloy as claimed in claim 1 is provided;
(b) a step in which the Ni—Cr—Fe-based casting alloy is melted and the Ni—Cr—Fe-based casting alloy is allowed to harden in the air to ambient temperature to obtain an article in which hot casting defects are not present; and
(c) a step in which the article is heat treated at a temperature at least 20° C. below the melting start temperature of the alloy to obtain a final article.

8. The method for producing a casting employing a Ni—Cr—Fe-based casting alloy as claimed in claim 7, wherein the heat treatment step (c) comprises:
a step in which the article is heated for 2-4 hours at a temperature of between 1150° C. and 1250° C. which is at least 20° C. below the melting start temperature of the alloy; and
a step in which the article is cooled to 550° C. or less at a rate of 65° C.-30° C. per minute, after which the article is cooled to ambient temperature in the air.

* * * * *